May 7, 1968 P. MINGOT 3,381,619
GEAR HYDRAULICAL MACHINE
Filed July 1, 1966 2 Sheets-Sheet 1

INVENTOR
PIERRE MINGOT
BY Young & Thompson
ATTYS.

United States Patent Office 3,381,619
Patented May 7, 1968

3,381,619
GEAR HYDRAULICAL MACHINE
Pierre Mingot, Morges, Switzerland, assignor to Prematex S.A., Morges, Switzerland, a corporation of Switzerland
Filed July 1, 1966, Ser. No. 562,200
Claims priority, application Switzerland, July 14, 1965, 9,847/65
14 Claims. (Cl. 103—126)

In the hydraulical gear machines, particularly in the hydraulical motors, the gear pumps, and so on, the difficulty which is encountered resides in the obtention of the tightness of the high pressure chamber of the hydraulic machine.

A first attempt to reduce the leakages of the high pressure chamber of a hydraulical machine provided with gears has been realized by increasing the diameter of the trunnions of the gears meshing the one with the other in order to distribute the pressures on greater surfaces and to obtain, due to the reduction of the specific pressure at the seals, a better tightness and therefore an increased efficiency.

The present invention enables however to still ameliorate in great proportions the hydraulical gear machines now on the market. The hydraulical gear machine according to the invention comprises at least two toothed wheels pivoted in a body, the one meshing with the other, and distinguishes itself by the fact that the diameter of the trunnions carrying at least one of these toothed wheels is approximately equal to the one of a circle passing through the summit of the toothing of the corresponding toothed wheel and by the fact that it comprises a piston displaceable within a housing provided in the body and presenting a frontal face comprising concave surfaces intended to cooperate with the teething of the toothed wheels in order to ensure the tightness of the high pressure chamber.

The attached drawing illustrates schematically and by way of example one embodiment of the hydraulical gear machine according to the invention.

Figure 1:
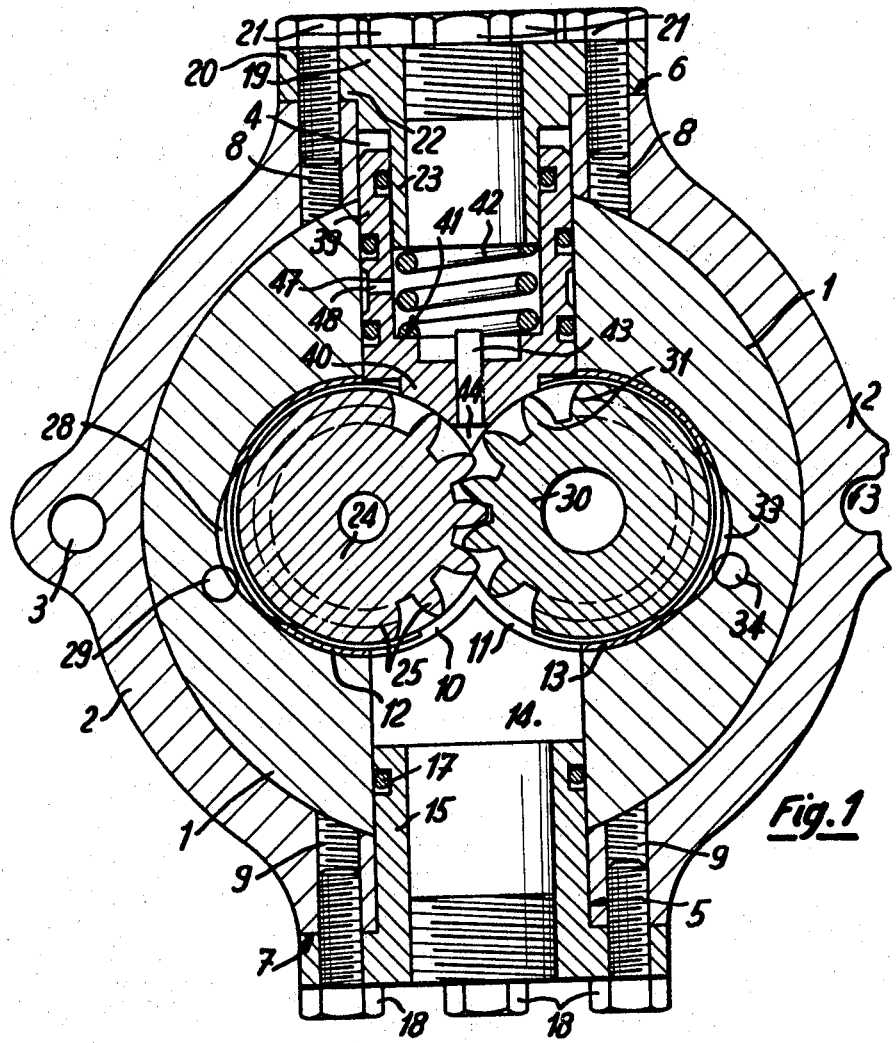
FIGURE 1 is a transversal cross-section of the hydraulical machine.
Figure 3:
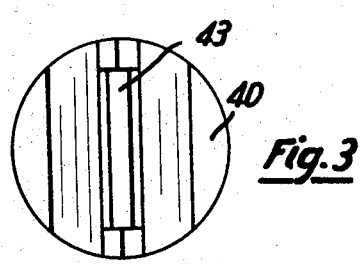
FIGURE 3 is an end view of the piston.
Figure 2:
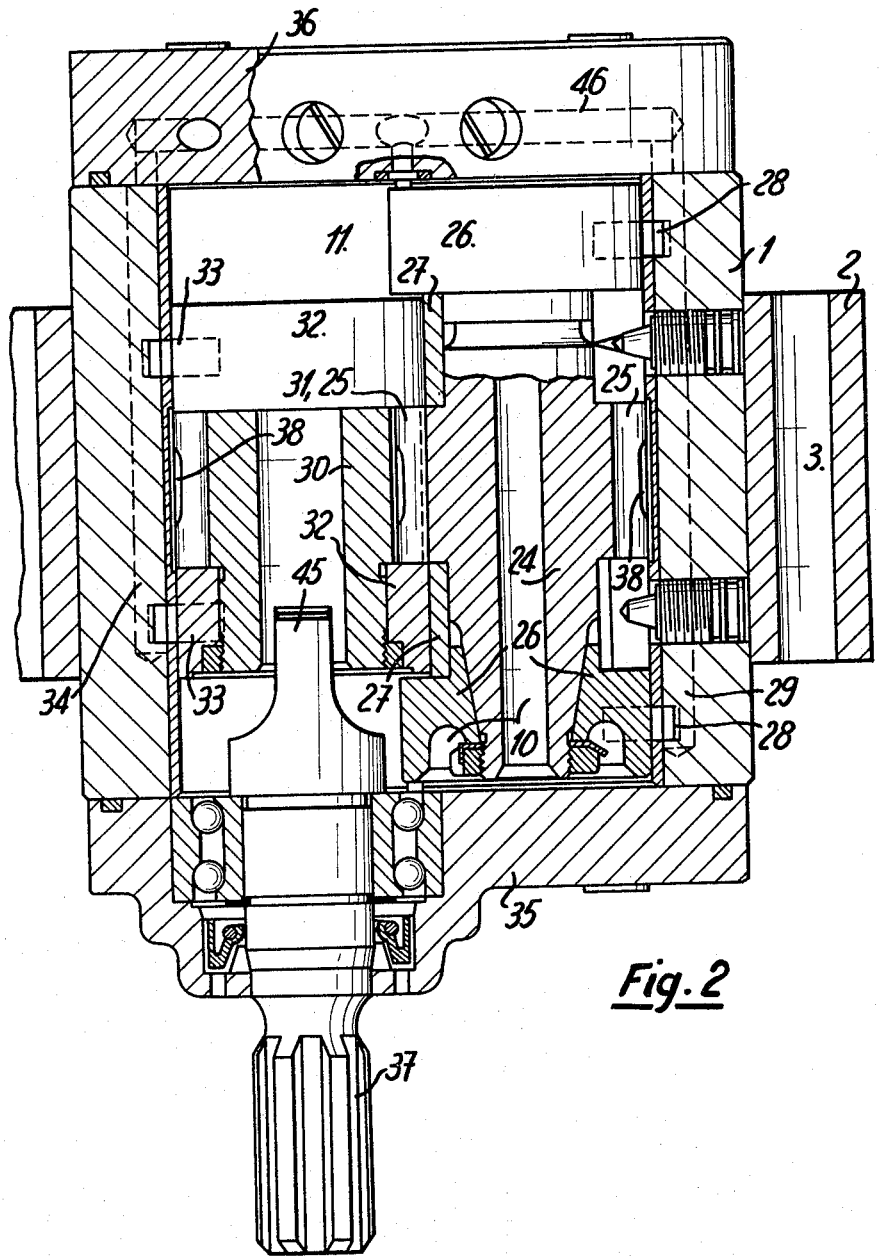
FIGURE 2 is a longitudinal cross-section of it.

The hydraulical gear machine shown comprises a cylindrical body 1 having a circular base. This shape has been chosen since it is the one permitting the easiest mounting of the machine. In effect, it may be so incorporated in any installation, machine-tools or other, by being simply lodged within a boring. This pretty solution has however been possible only through the fact that the hydraulical gear machine described presents a particularly high efficiency, that is to say that the losses due to friction are very reduced, thus limiting the thermal dissipation which is necessary. This important feature of the hydraulical gear machine described results, as will be seen later on, from the specific constructive characters of it.

This cylindrical body 1 is, in the example shown, mounted inside a fixing bracket 2. This fixing bracket 2 comprises two borings 3 intended to receive tightening members for the fixation of the hydraulical machine on a frame of a machine or on any installation. This bracket 2 comprises further two holes 4, 5, diametrically opposed opening towards the outside on connecting surfaces 6, 7 respectively provided with tappings 8, 9 in the example shown.

In a general way, this cylindrical body 1 is mounted inside a fixing member which surrounds it totally on at least one part of its length, so that the efforts due to the pressure on the high pressure side be uniformly distributed on this body. This enables to avoid any unwanted deformation of it.

The body 1 of the hydraulical machine comprises two longitudinal bores 10, 11 having axes which are parallel between themselves as well as with the longitudinal axis of the body 1. In the example shown, these bores are of same diameter and their axes are separate one from the other from a center distance, equal to that of the gearing, so that they cut themselves along a longitudinal symmetry plan of the body 1. These bores 10, 11 are coated and comprise thus a coating 12, 13 respectively made in an antifriction metal for example.

This body 1 comprises further a transversal bore 14, the axis of which is located in the intersection plan of the two longitudinal borings 10, 11 perpendicularly to the axes of said borings 10, 11. In working position, this transversal bore 14 is exactly coaxial to the holes 4, 5 provided in the fixing bracket 2.

A low pressure connecting member, constituted by a sleeve 15 presenting at one of if ends a flange 16, traverses the hole 5 and extends into the transversal boring 14. The outside diameter of the sleeve 15 corresponds to the inside diameters of the said borings 5 and 14 to ensure a good assembly without clearance or leakages. To ensure the tightness between this sleeve 15 and the boring 14, a joint 17 is provided. This low pressure connecting member is fixed by means of tightening members 18 traversing the borings provided in the flange 16 against the connecting surface 7. The outside part of this connecting member is threaded and is intended to be connected to the end of a hydraulic fluid duct (nonillustrated).

A high pressure connecting member, also constituted by a sleeve 19 presenting a flange 20 is fixed by means of tightening members 21 on the connecting surface 6 of the bracket 2. This sleeve 19 extends through the boring 4 and inside the tranversal bore 14. This sleeve is however constituted by a centering portion 22 the outside diameter of which corresponds to the internal diameter of the bore 4 and through a skirt 23 the outside diameter of which is less than the end of the bores 4 or 14 so as to provide between it and the wall of these bores 4, 14 an annular space. The external end of this connecting member is threaded internally and is intended to be connected to the end of a hydraulic fluid duct (nonillustrated).

A first toothed wheel 24 comprises a center portion provided with a toothing 25 and extremities rendered fast with trunnions 26 the outside diameter of which corresponds to the diameter of the longitudinal bore 10. These trunnions 26 are disposed in the immediate vicinity of the ends of the bore 10 and are separated from the central portion of the gearing by means of rings 27 the angular position as well as the axial position of which is fixed by means of dogs screwed in the body 1 of the hydraulical machine. These rings 27 present an outside diameter approximately equal to the diameter of a circle passing through the summit of the teeth of the toothing 25 of the toothed wheel 24. Further, the axial position of these rings 27 is such that the clearance between each of them and the corresponding side of the toothing, be reduced at the minimum. Further, the internal diameter of the said rings is as great as possible, that is to say slightly less, but substantially equal, to the diameter of a circle passing through the foot of the teeth of the toothing 25 of the toothed wheel 24. All these dispositions tend to the same aim, to increase the interfaces where leakages are likely to take place, to diminish therefore the specific pressures at the locations where leakages are able to take place, so as to reduce these leakages at a value as low as possible.

The rings 27 being independent from the toothed wheel 24, the trunnions 26 of it are thus built up elements. This construction is dictated by mounting reasons which are evident. In fact, the trunnions 26 are rendered solid with the body of the gearing 24 by any known convenient means.

Pressure equilibrating housings 28 are provided in the internal surface of the bore 10 in front of the trunnions 26 on a part of the periphery of this bore. These housings 28 are disposed angularly in such a way that their symmetry axes make an angle comprised between 10 and 30° with respect to a perpendicular direction to the axes of the bores 10 and 14. The exact angular position of these equilibrating housings is determined so as to enable the compensation of the efforts created by the working of the hydraulic machine, through the pressure being in the high pressure chamber, and tending to space the gears apart one from the other and to center them with respect to the bores in which they are lodged. In a general way, the dimension and the position of these housings are determined in order that the liquid under pressure which fills them, provokes a counter pressure which diminishes substantially the specific pressure between the trunnion and the antifriction metal. These housings 28 communicates by means of a duct 29 provided in the body 1 of the hydraulical machine which is itself connected to the high pressure chamber of the hydraulical machine, as described hereunder.

A second toothed wheel 30 comprises a center portion carrying a toothing 31 and extremities which are rendered solid by any known means with trunnions 32.

The toothing 25 of the first toothed wheel 24 is in mesh with the toothing 31 of the second toothed wheel 30 whereas the trunnions 32 of this latter are located in front of the rings 27 of the first toothed wheel 24. To this end, these rings 27 have notches presenting a shape such that in front of these rings, the complete shape of the bore 11 be reconstituted. The trunnions 32 of the second toothed wheel 30 pivot thus in a bore which is constituted for one part through the body 1 of the machine and for a second part through the rings 27.

The trunnions 32 are fitted inside the bore 11 and their internal side is locked against the corresponding sides of the toothing 31 so as to reduce as much as possible the clearances where leakages could take place. Further, as for the rings 27, the internal diameter of these trunnions is as great as possible, that is to say slightly less but substantially equal to a circle passing through the feet of the teeth of the toothing 32 in order to increase the surfaces and thus to diminish the specific pressures at locations where leakages could be possible. Furthermore, the outside diameter of these trunnions 32 is approximately equal to the one of a circle passing through the summit of the teeth of the toothing 31 of the toothed wheel 30. The length of the teeth of the toothing 31 is slightly greater than the one of the toothing 25 to enable the meshing.

Pressure equilibrating housings 33 are also provided in the surface of the bore 11, in front of the trunnions 32 and this for the same reasons as described with respect to the utility of the housings 28. These housings 33 communicate with a duct 34 provided in the body 1 of the hydraulical machine, duct which is connected, as the duct 29, with the high pressure chamber.

The described hydraulical machine is further provided with two end covers 35, 36 fixed by any known means on the body 1 so as to obturate in tight manner the bores 10 and 11 at each of their extremities. One of these covers 35 is traversed by a driving member 37 in mesh, through the intermediary of a screw-driver coupling 45, with the second toothed wheel 30.

The other cover 36 is perforated with ducts 46 connecting the ducts 29 and 34 to a hole (not illustrated) provided in the body which itself opens in the collector 47 provided in the outside surface of the piston 30 to communicate in its turn with the high pressure chamber through the boring 48.

It has to be noted that in the pump described hereabove, all the interfaces where leakages may occur of the hydraulical liquid are realized in such a manner as to present always a surface as great as possible, which enables on the one hand to realize machinings of high precision of these surfaces and on the other hand to diminish the specific pressure of the hydraulical liquid in these interfaces. These two factors are important for the reduction of the hydraulic liquid leakages.

It has also to be noted that each tooth of the teething 25 and 31 comprises a bi-lateral depression 38 in the center which does not break the summit line. The dimensions of this depression 38 are such that with the shape of the teeth and whatever their relative position is, there is substantially only one complete contact line between these teeth forming a tight seal between the two toothed wheels and not two lines as it is often the case. This enables to avoid during the rotation a compression of the liquid which would be caught periodically in the two lines of contact of two successive teeth, which brings about high power losses, the said hydraulic liquid being non-compressible. In fact, in certain constructions actually known in which a tooth of one toothed wheel is in contact with two teeth of the other toothed wheel and that along two lines forming each a tight seal, there is produced during the rotation of this gearing a modification of the volume, principally a reduction, comprised between these two tight joint lines and the hydraulic liquid lodged between them is compressed. This creates the formation of a resistant torque of high value and causes further wearing of the bearings as well as of the gearings in imposing to them important radial efforts. These annoying phenomena are entirely eliminated owing to the bi-lateral depression 38 provided in each tooth of the gearing 25 and 30.

The hydraulic machine described already enables to reach very good performances, however it is submitted to nonnegligible leakages of the hydraulic liquid out of the high pressure chamber (formed by the extremity of the transversal bore 14 opening in the bore 4 of the bracket 2). To reduce these leakages to a value as small as possible, which may be considered as negligible, the present hydraulic machine is provided with a piston comprising a skirt 39 the outside diameter of which corresponds to the one of the bore 14 and thus to the one of the bore 4 also and the inside diameter of which corresponds to the outside diameter of the skirt 23 of the high pressure connecting member. This skirt 39 is located on a part at least of its length inside the space provided between the wall of the bores 14, 4 and the outside wall of the skirt 33. O-ring type seals are provided to avoid any leakage between the skirt 39 of the piston and the bore 14 on the one hand and the skirt 23 on the other hand. The bottom 40 or frontal wall of this piston comprises an internal shoulder 41 on which rests one of the ends of a coil spring 42 bearing with its other end on the frontal surface of the skirt 23 of the high pressure connecting member. In this way, the piston tends to displace itself towards the gearing 24 and 30. The outside surface of the bottom 40 of this piston presents two lateral parts which are concave and presenting each a curvature radius identical to the circle passing through the summit of the teeth of the corresponding toothed wheel. These lateral parts come thus, under the action of the spring 42 and of the pressure of the hydraulic liquid, in contact against the external surface of the rings 27 and are thus located in the immediate vicinity of the summit of the teeth of the toothed wheels. These concave surfaces cooperate with the summit of the teeth of the toothed wheels to realize the tightness of the high pressure chamber. A narrow passage, having the form of a slot 43, traverses longitudinally the bottom 4 of the piston and connects the inside of said piston and the high pressure connecting member to the high pressure chamber 44.

As a matter of fact, this high pressure chamber 44 is limited to a very reduced volume, of the order of two to three times of the volume comprised between two teeth of the teething 25, 31 of the gearing 24, 30. In fact, the surface of these lateral parts of the frontal face of the piston has a shape corresponding to the one generated by the summit of the teeth of the gearing during its angular displacements, a tight seal is realized between the piston and this gearing. In fact, each of the concave parts comes near across respectively and alternatively one or two teeth of the wheels in rotation, and determines the dimension of the high pressure chamber. This high pressure chamber, restricted to the maximum, wets only a little number of teeth of the gearing. In that way, the hydraulic pressures on each toothed wheel are kept to the minimum, as well as the specific pressures on the sleeves of the trunnions. This limitation of the volume of the high pressure chamber of the hydraulical machine enables, everything remaining the same, to reduce in a great proportion, the length of the interfaces submitted to a high pressure so that the leakages of hydraulic fluid are restricted in the same proportion. The volume of this high pressure chamber 44 being very low, it has been possible to render the leakages negligible, what leads to a substantial increase of the efficiency of the hydraulical machine.

It is further to be noted that the surface of the outside face of the bottom 40 of the piston is less than the internal face of this bottom 40 submitted to the high pressure, so that during the working of the machine, the piston is automatically applied against the rings 27, so that the tightness of the high pressure chamber 44 is automatically ensured. As a matter of fact, the force with which the piston is applied against the gearings is dependent from the pressure established in the high pressure chamber. The differential pressure applying the piston, on top of the strength of the coil spring, against the rings 27 may be adjusted by modifying the ratio between the internal and external surfaces of the bottom of this piston.

Each concave part of the outside face of the bottom 40 of the piston has a sufficient length so that it be, whatever the angular position of the gearing is, able to cover always and completely the summit of at least one of the teeth of the corresponding toothed wheel. It is evident that in variants not shown, two teeth could always be in contact with each of these concave parts. Such a realization enables still a better tightness of the high pressure chamber 44.

Furthermore, the width or the diameter of the piston is higher than the length of the gearing, that is to say to the axial spacing of the teeth. In this way, the edges of the frontal face of the piston bear against the rings 27 on the one hand and on the trunnions 32 on the other hand. In this manner, after a first relatively short working period of the hydraulical machine, the friction coefficient between the teeth of the gearing and the concave parts of the frontal faces of the piston falls to a value which is equal to zero. This has further the advantage to effectively limit the leakages which could take place between the body 1 and the rings 27 or the trunnions 32 in the vicinity of the high pressure chamber.

The working of the hydraulical machine described is similar to the working of the known gear hydraulical machines but enables, due to the fact of the reduction of the leakages to a negligible value, on the one hand through the reduction of the volume of the high pressure chamber and, on the other hand through the reduction of the specific pressures at the interfaces where leakages are able to take place, to obtain a much higher efficiency than the ones now obtained. With an hydraulical machine as the one described working as a pump, it is for example possible to realize a pressure difference between the low pressure and the high pressure side of the pump having only one stage, of the order of 250 atmospheres and more.

Practical tests have shown that when the hydraulic machine works either as a pump or as a motor, the friction losses, which appear generally as a warming up of the machine provoking a thermal dissipation, are very low, which enables the obtention of efficiency not reached until now (of the order of 90%). The warming up of the body 1 of the hydraulic machine is very low, and stabilizes for a continuous working at full load of it at a temperature of about 15 to 20° C. above the ambient temperature only. This is remarkable owing to the fact that the shape of the body 1 of the machine has not been studied in function of an optimum thermal dissipation but on the contrary in function of a practical utilization of the machine, which leads to a cylindrical solid body which is particularly disadvantageous for the thermal dissipation.

Thanks to its very low thermal dissipation, this hydraulical machine can be directly placed in a bore provided for example in a frame of a machine-tool, which enables many applications which were until now not realizable for example in the automation of machine-tools particularly.

Further, thanks to the equilibrating housings 28 and 33, the efforts on the trunnions 26 and 32 as well as on the portions of internal surfaces of the bores 10 and 11 on which these trunnions revolve are maintained within acceptable limits even if very high pressures are developed in the high pressure chamber 44, so that the wear of this hydraulic machine is greatly reduced. Furthermore, in case of wearing after very long working periods, it suffices, to put the hydraulic machine in good condition again, to turn again the bores 10 and 11 and to replace the trunnions 26 and 32. The machine repaired is thus as a new machine.

It is further to be noted that the piston limiting the volume of the high pressure chamber is realized in a soft metal presenting good antifriction qualities, such as bronze for example. Hereto after a very long working period of the machine, it suffices to change this piston if its frontal face, cooperating with the teeth of the gearing, presents a too great wearing. In most cases, it suffices even to remachine the concave parts of the frontal face of the piston to set the machine in a good state.

It is to be seen that the hydraulical machine described may be very easily and at low cost maintained when it is necessary.

It is evidence that in variants, a hydraulical machine having several stages could be conceived. In fact, it suffices to place in a same body pairs of toothed wheels with their associated members.

In a variant not shown, the toothed wheel 24 could be pivoted through the intermediary of trunnions of low diameter revolving on the internal surface of the rings 27. This enables to reduce the outside dimension of the hydraulical machine.

I claim:

1. An hydraulical gear machine, particularly a motor, a pump and so on, comprising at least two toothed wheels pivoted in a body meshing the one with the other, in which the diameter of the trunnions bearing at least one of these toothed wheels is substantially equal to the one of a circle passing through the summit of the teeth of the corresponding toothed wheel and which comprises a piston, linearly displaceable in a bore provided in the body, and presenting a frontal face comprising concave surfaces intended to cooperate with the teething of the toothed wheels in order to ensure the tightness of the high pressure chamber.

2. An hydraulical machine according to claim 1 in which the body presents two longitudinal bores having parallel axes inside which are lodged the said toothed wheels, and in which the trunnions carrying the one of the gears are axially spaced apart with respect to the trunnions carrying the other toothed wheel, and in which further these trunnions are pivoted directly in the said longitudinal bores.

3. A machine according to claim 2 in which one of the said toothed wheels comprises fixed rings located between its center portion carrying the toothing and its trunnions, said rings having a diameter corresponding to the one of the bore inside which they are placed, these rings being located in front of the trunnions bearing the other toothed wheel and comprising housings having the shape of circle segments giving passage to the trunnions of the said other toothed wheel.

4. A machine according to claim 1 which comprises further, provided in the said bores and in front of the said trunnions carrying the toothed wheels, equilibrating housings fed with hydraulic fluid under pressure from the high pressure chamber of this machine.

5. A machine according to claim 4 in which the radial position of these equilibrating housings is such that they enable to compensate the radial effort exerted on the said toothed wheels through the pressure being in the high pressure chamber.

6. A machine according to claim 1 in which the body presents an outer cylindrical shape.

7. A machine according to claim 6 in which this body is fixed inside a bracket or any other fixing member which surrounds completely this body on a part at least of its length, distributing on this body, along directions opposite to the forces tending to deform it, the high pressures taken by the connecting member.

8. A machine according to claim 7 in which the said body is a cylinder of revolution presenting a circular cross-section.

9. A machine according to claim 1 in which the outside frontal face of the said piston comprises a center plane portion and two lateral curved portions presenting a curvature radius identical to the one of a circle passing through the summit of the teeth of the corresponding toothed wheel.

10. A machine according to claim 9 in which this piston comprises a slot traversing its bottom and opening in the center part of its frontal face, this slot connecting the high pressure chamber, delimited by a portion of each of the teething of the toothed wheels and a portion of the frontal face of the piston, to the outlet of the machine.

11. A machine according to claim 10 in which the outside surface of the bottom of the said piston, submitted to the action of the pressure being in the high pressure chamber, is lower than the internal surface of the said bottom submitted to this same pressure, so that this piston is automatically maintained with a strength determined by the value of the pressure being in said high pressure chamber, in the immediate vicinity of the summit of at least one of the teeth of each toothed wheel.

12. A machine according to claim 11 in which this piston is also submitted to a resilient action tending to bring it towards the said toothed wheels, so that it occupies automatically its service position, even when the machine is at rest.

13. A machine according to claim 11 in which the diameter of the piston is greater than the axial extent of the teeth of the toothed wheels, so that it covers the trunnions of one of the toothed wheels while bearing on the rings mounted concentrically to the other toothed wheel.

14. A machine according to claim 1 in which the trunnions of one of the toothed wheels present a low diameter and by the fact that the trunnions of the two toothed wheels are disposed in same transversal plane.

References Cited

UNITED STATES PATENTS

| 2,236,980 | 4/1941 | Ungar | 103—126 |
| 2,759,426 | 8/1956 | Blomgren et al. | 103—126 |
| 2,855,854 | 10/1958 | Aspelin | 103—126 |
| 3,128,710 | 4/1964 | Blomgren et al. | 103—126 |

FOREIGN PATENTS

| 894,227 | 3/1944 | France. |
| 625,405 | 2/1936 | Germany. |

FRED C. MATTERN, JR., *Primary Examiner.*

WILBUR J. GOODLIN, *Examiner.*